Patented Jan. 6, 1953

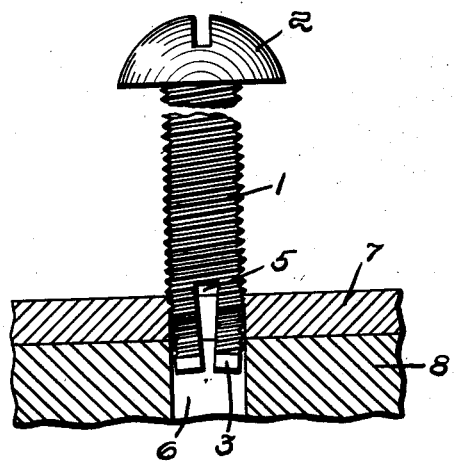
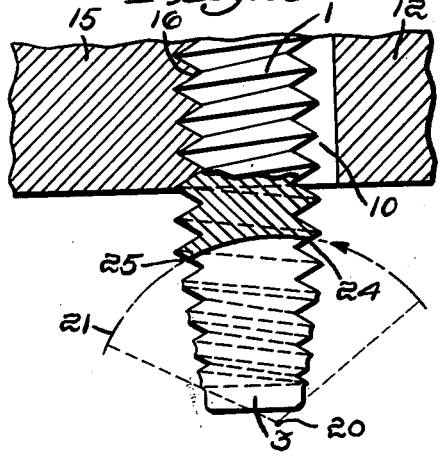
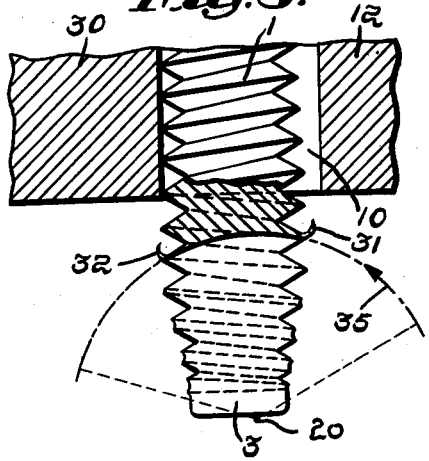

2,624,228

UNITED STATES PATENT OFFICE 2,624,228

FASTENER WITH SLOTTED PILOT PORTION

Frank Kinney Brown, South Dartmouth, Mass., assignor to Research Engineering & Manufacturing, Inc., New Bedford, Mass., a corporation of Massachusetts Original application July 22, 1949, Serial No. 106,232. Divided and this application April 25, 1950, Serial No. 157,906

1 Claim. (Cl. 85—47)

The present application is a divisional of my prior and copending application Ser. No. 106,232 filed July 22, 1949, now Patent 2,590,597, issued March 25, 1952, on Method of Slotting Screw Fasteners and Improved Fastener Made Thereby, the present application being directed to claim the fastener as an improved article of manufacture.

My present invention is directed to the type of fastener particularly the self-tapping screw fastener illustrated in my prior Patent No. 2,292,195 dated August 4, 1942, and is particularly intended to improve and perfect the same, and more particularly to produce a fastener with a slotted pilot end which will be free of objectionable burrs at the base of the slotted portion which ordinarily are formed where the saw cuts enter thru and emerge from the threads in the fastener. Such burrs were even formed to such an extent as to destroy the self-threading action in the subsequent driving-home of the fastener and, thus, seriously impaired the holding capacity of the threads.

Therefore, prior to my present invention, the depth of the saw-cut in the pilot end of the fastener varied relatively with the flanks of the threads, particularly at the depth of the slot dependent on the relative rotative positioning of the fastener and the saw-cut, the saw-cut being liable to enter and leave the side flanks or faces of the threads at such an angle as to create and leave the objectionable burrs above noted.

I have discovered that in order to carry out my process, it is desirable to position the saw at a point eccentric with the axis of the fastener being slotted, which thus still further enables the saw-cut to form a slot free of burrs either at the entering or leaving face of the fastener, which, in combination with means to automatically position and hold the fastener in the desired relative position with the saw so that the cut will both enter and leave the same flank of the thread that the formation of burrs is eliminated and the consequent holding capacity of the screw threads as they are driven into the article, or articles, is maintained unimpaired.

Thus my present invention, including the non-burr-forming process described in said main application Ser. No. 106,232, of which the present is a divisional, produces a slotted threaded fastener having all the advantages of the slotted pilot construction of the fastener of my said prior Patent No. 2,292,195 together with the elimination of the objectionable burrs formerly formed by the slotting operation.

While my invention can be applied to any desired type of slotted fastener, I prefer to utilize same in connection with the type illustrated in my said prior patent wherein a straight pilot section below the threaded part is formed on the fastener, which is also illustrated in my said patent.

Referring to the drawings illustrating my present improved process:

Fig. 1 is a diagrammatic view illustrating the type of fastener with a slot formed in the pilot or entering end and fitted in a pre-bored opening in the pair of articles to which the fastener is to be applied;

Fig. 2 is an enlarged fragmentary view in cross-sectional illustrating the relative eccentric position of the saw and the line of cut at the depth of the base of the slot, wherein the entering line of cut is at a relatively acute position on the flank of the thread between the crest and base of same, and the emergence of the line of cut is approximately at a right angle with the flank of the thread, together with the threaded gripper illustrated in diagrammatic form which automatically positions the threads in desired position relative to the line of saw-cut; and Fig. 3 is a diagrammatic view of the former method of holding a threaded fastener with a non-threaded gripper and wherein a saw-cut even with the center of the saw eccentric to the axis of the fastener would result in forming burrs both at the entering and leaving faces of the threads.

Referring to the drawings illustrating my present process and improved fastener formed without burrs, I indicates a typical threaded self-tapping fastener of the type shown in my said prior patent, with the head 2, pilot end 3, and longitudinal slot 5 thru the pilot end permitting this slotted end to be sprung together slightly when the fastener is positioned in a pre-formed hole or opening 6 in articles 7 and 8 to be held together by the fastener.

As shown in Fig. 2, the threaded portion 2 in the fastener is held between the usual V-shaped slot 10 in the rotatable carrier 12 and my novel threaded gripper 15 as the carrier 12 moves the fastener into alignment for the slotting operation by a circular saw. Such saw would be positioned eccentrically relative to the axis of the fastener with the center of the saw substantially as indicated at 20, and the line of cut at the base of the slot formed being indicated by the dotted line 21.

In my machine, the saw is mounted on a vertically movable yoke which is raised lengthwise of the fastener when the latter is positioned over the saw and which lifting of the saw is limited to the depth of the slot desired and with the cooperation of the threaded gripper 15, which either raises or lowers the fastener automatically by the self-seating action of the gripper threads 16 on the adjacent threads of the fastener 1, the same is held in correct relative position so that the depth of the saw-cut with the saw rotating in a contra-clockwise direction, as indicated by the arrows, will enter the flank of the thread approximately as indicated at 24 at an acute angle and leave the same at a point as indicated at 25 at nearly the perpendicular angle with the flank of the thread, thus eliminating burrs at either the entering or leaving point.

In Fig. 3 I have illustrated the present and prior method and operation of slotting the fastener, wherein the carrier 12 held the fastener 1 and a non-threaded carrier 30 was pressed in contact with the crest of the threads and did not raise or lower the fastener in any predetermined positioning location relatively with the saw-cut but simply held the same with the threaded faces at random, so that the resultant saw-cut might and usually did form entering burrs, as indicated at 31, and leaving burrs, as indicated at 33, on the threads. Even if the saw-cut was eccentric, as also illustrated in Fig. 3, the line of cut 35 entering the threaded portion of the fastener indiscriminately would form the contours at the base of the slot 5.

Thus it will be appreciated that my discovery and invention of the critical position of the cutting saw and the automatic predetermined positioning of the threads of the fastener relative to the saw-cutting operation provides for the formation of a perfectly slotted fastener of the kind described, eliminating the objectionable burrs formerly produced and saving time, expense, delay, and the difficulty of inspecting for burrs, re-rolling to remove same or displace them from the thread outline, as well as a subsequent inspection to see if the slot has been distorted by pinching during the re-rolling operation.

I claim:

As a new article of manufacture, a threaded fastener having a head at one end, and a diametrically positioned longitudinal axial slot at the opposite end, the base of the slot being cut on an arc from a center eccentric to that of the longitudinal axis of the fastener, said arc extending from an acute angle relatively with the surface of the flank of one thread to a nearly perpendicular angle with the surface of the flank of an adjacent thread diametrically opposite thereto, whereby a smooth non-burring threaded surface is secured independently of re-rolling and burr-removing operations.

FRANK KINNEY BROWN.

REFERENCES CITED

The following references are of record in the file of this patent:

UNITED STATES PATENTS

| Number | Name | Date |
|---|---|---|
| 1,909,476 | Trotter | May 16, 1933 |
| 2,156,350 | Olson | May 2, 1939 |
| 2,292,195 | Brown | Aug. 4, 1942 |